(No Model.)

O. H. WOODWORTH.
COMBINED RAKE AND GROUND LEVELER.

No. 415,599. Patented Nov. 19, 1889.

Witnesses
L. D. Davidson
R. W. Mills

Inventor
Orson H. Woodworth

United States Patent Office.

ORSON H. WOODWORTH, OF COLUMBIA CITY, INDIANA.

COMBINED RAKE AND GROUND-LEVELER.

SPECIFICATION forming part of Letters Patent No. 415,599, dated November 19, 1889.

Application filed July 22, 1889. Serial No. 318,320. (No model.)

*To all whom it may concern:*

Be it known that I, ORSON H. WOODWORTH, of Columbia City, in the county of Whitley and State of Indiana, have invented a new and useful Combined Rake and Ground-Leveler, of which the following is a full, clear, and exact description.

My invention consists, principally, in the combination and application of a cutting, scraping, or leveling plate or blade with and to the head and teeth of an ordinary garden or field rake in such a manner that the rake and blade are readily adjusted to each other for raking, scraping, or leveling the ground when cultivating or grading the same.

The invention also consists of the construction, arrangement, and combination of parts, as hereinafter described and claimed.

Reference is to be had to the accompanying drawings, forming a part of this specification, and in which similar letters refer to corresponding parts in both figures.

Figure 1:
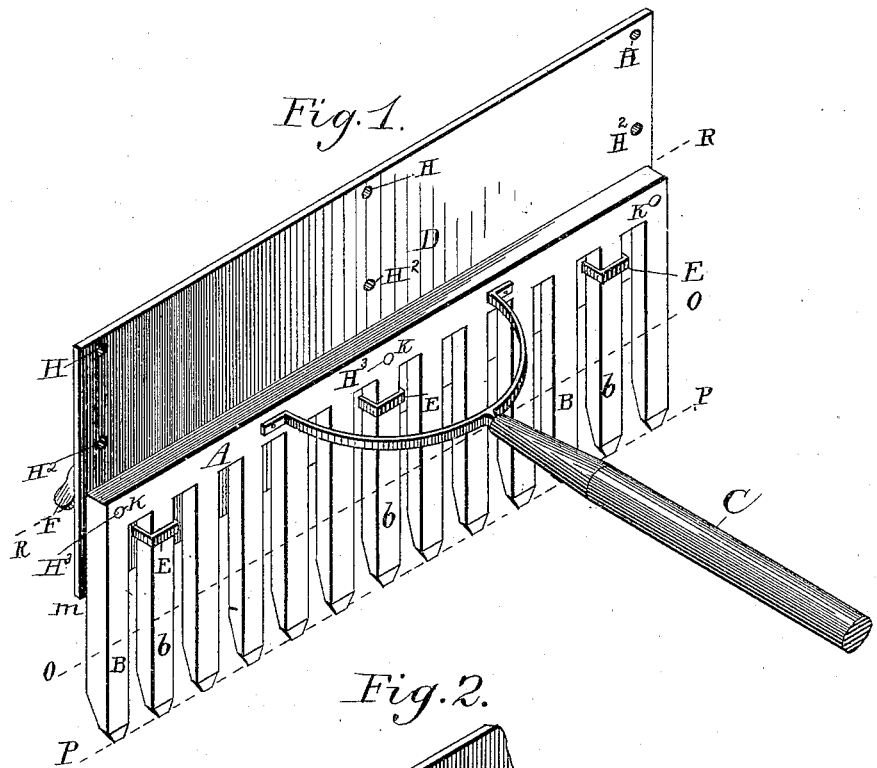
Figure 2:
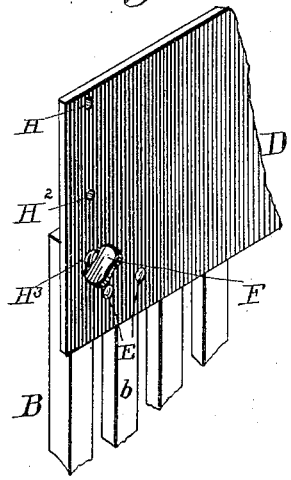

Figure 1 is a front elevation of the essential features of my invention, and Fig. 2 is a rear elevation of a portion of the same.

A represents the rake-head of an ordinary rake; B B, the teeth thereof; C, the handle, and D the cutting, scraping, or leveling plate or blade as connected and combined with the rake head and teeth. To plate or blade D are riveted the loops E E E, made to snugly fit and yet freely move up and down on teeth $b\ b\ b$. Blade D is also provided with holes H, $H^2$, and $H^3$, through which thumb-screws F F F are inserted into screw-holes K K K in rake-head A, and thereby the blade is securely screwed to the rake-head. The handle is attached to the rake-head in the usual manner.

The practical operation of my invention is substantially as follows: The blade being attached to the rake-head in the position shown in Fig. 1, the combined rake and ground-leveler is operated substantially as an ordinary rake, with teeth B entering the ground nearly their whole length; but, when desired, this combined implement may be inverted and the blade used as a cutter, scraper, or leveler, with the teeth upward and the upper edge $d\ d$ of the blade turned down to the ground. To change the relative positions of the rake head and blade as they appear in Fig. 1, the thumb-screws are withdrawn, the blade lowered, and the loops slipped down on teeth $b\ b\ b$ until the blade can be screwed to the head through holes $H^2\ H^2\ H^2$ and into the screw-holes in said head, which being done the lower edge $m$ of the blade is thereby brought down to about the line O, thus covering about one half of the length of teeth, the other half being free to penetrate the earth up to the lower edge of the blade at O, where said lower edge comes in contact with the ground and scrapes or levels the same as the implement is operated. The blade may also be lowered and fastened through holes H H H, thus bringing its upper edge down to line R, its lower edge to line P, and covering the whole length of the teeth, this last-named adjustment changing the implement to a scraper or leveler and rendering it inoperative as a rake.

Thus by means of the construction, arrangement, and combination of the various parts of my invention, as hereinbefore described and illustrated, it is readily adjustable or adapted to practical use as a cutter, a scraper, a leveler, a long-toothed rake and ground-leveler combined, or a short-toothed rake and ground-leveler combined.

Having thus described my invention, what I claim as new, and desire to secure by Letters Patent of the United States, is—

The combination of rake-head A, teeth B B B, loops E E E, blade D, holes H, $H^2$, and $H^3$, thumb-screws F F F, and screw-holes K K K, substantially as and for the purposes set forth.

ORSON H. WOODWORTH.

Witnesses:
BENTON E. GATES,
W. A. MILLER.